Dec. 24, 1935.     H. C. BOHNET     2,025,638
FLASHING LIGHT SIGNAL
Filed Nov. 1, 1930     4 Sheets-Sheet 1

H. C. Bohnet, INVENTOR
BY Victor J. Evans
ATTORNEY

Dec. 24, 1935. H. C. BOHNET 2,025,638
FLASHING LIGHT SIGNAL
Filed Nov. 1, 1930 4 Sheets-Sheet 3

H. C. Bohnet, INVENTOR

BY Victor J. Evans ATTORNEY

Dec. 24, 1935.   H. C. BOHNET   2,025,638
FLASHING LIGHT SIGNAL
Filed Nov. 1, 1930   4 Sheets-Sheet 4
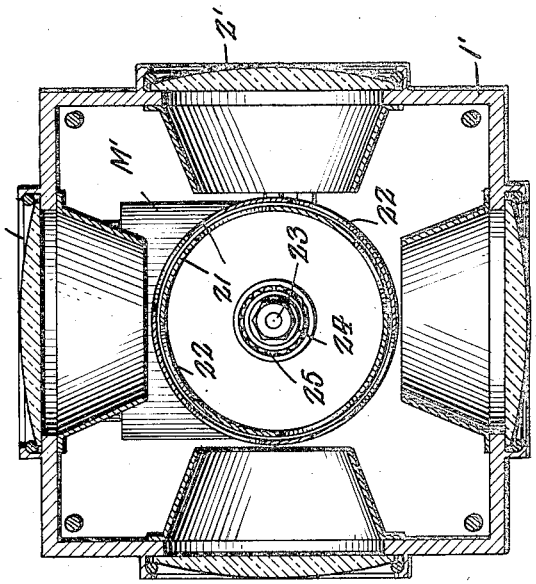
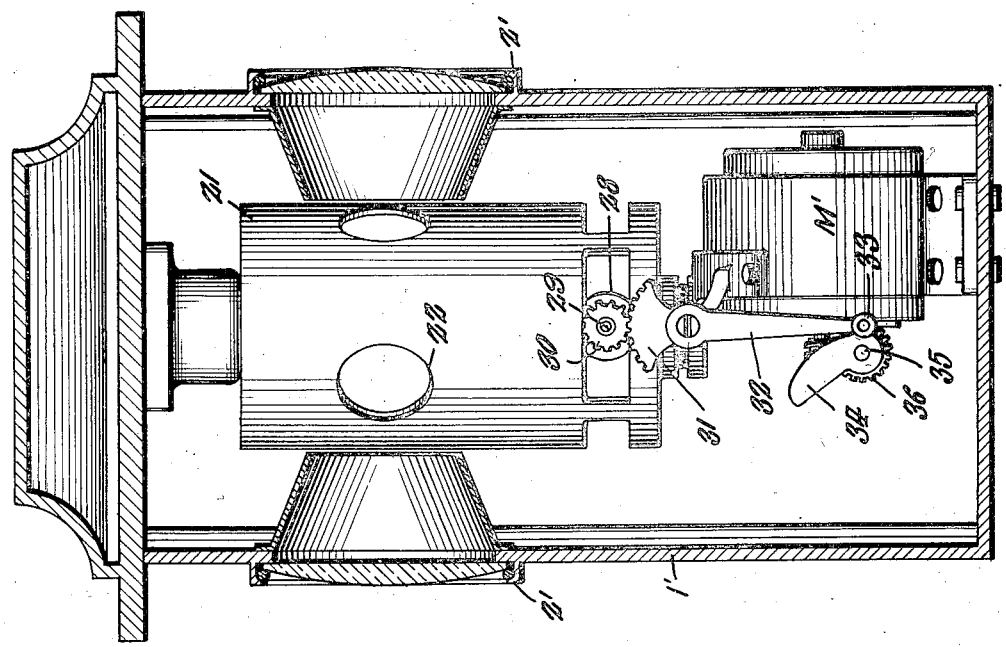
H. C. Bohnet,
INVENTOR
BY Victor J. Evans
ATTORNEY Patented Dec. 24, 1935

2,025,638

UNITED STATES PATENT OFFICE 2,025,638

FLASHING LIGHT SIGNAL

Herman C. Bohnet, Lansing, Mich.

Application November 1, 1930, Serial No. 492,827

1 Claim. (Cl. 177—329)

This invention relates to a traffic signal, the general object of the invention being to provide means for intermittently operating a shutter means which controls the rays of light passing from a lamp to the signal so that the signal will be illuminated at intervals of time, with a magnetic motor for operating the shutter means so that there is no danger of the device interfering with radio and similar devices.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 7 is a section on line 7—7 of Figure 5.

Figure 8 is a section on line 8—8 of Figure 5.

Figure 1:
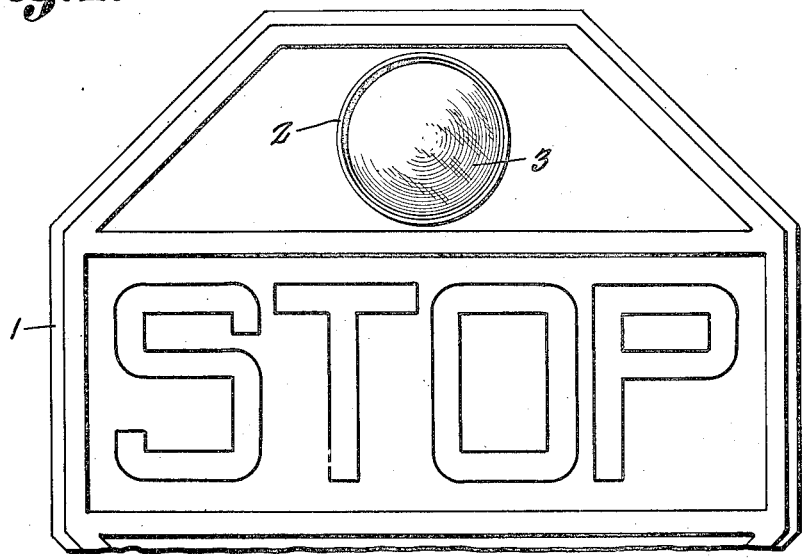
Figure 1 is a front elevation of part of the device.
Figure 4:
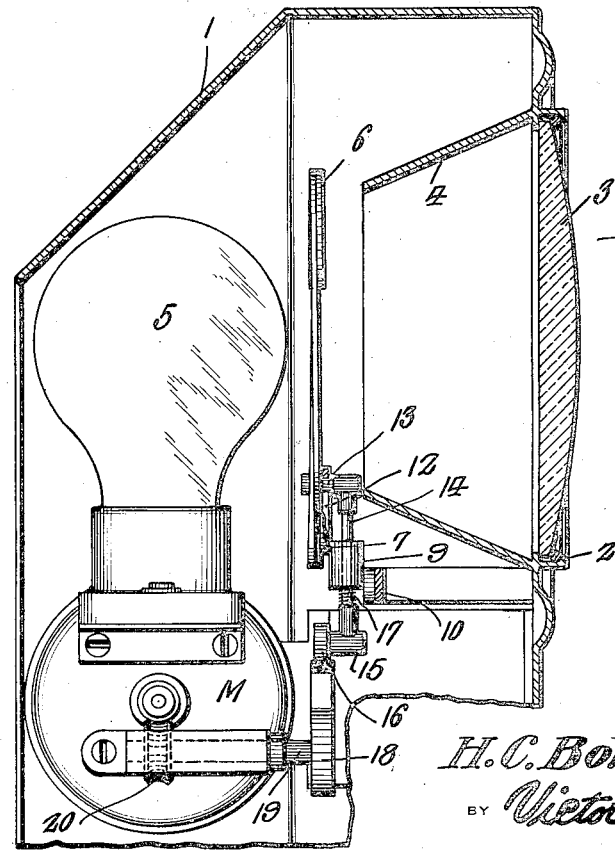
Figure 4 is a section on line 4—4 of Figure 2.

In these drawings, the numeral 1 indicates a casing which is formed with a window 2 in one side thereof, which contains a lens 3 and a semiconical reflector 4 is provided for directing the rays of light from a lamp 5 through the lens. A two-part shutter controls the passage of the rays of light from the lamp through the lens, the two parts of the shutter being shown at 6 and each part is of the substantially crescent shape. Each part is pivoted adjacent its lower end to a bracket 7 by a screw 8, the bracket being attached at its lower end to a bushing 9 which is connected to a bracket 10 supported in the casing. A slot 11 is formed in the lower end of each part of the shutter, inwardly of the pivotal point, and a vertical slot 12 is formed in the bracket 7. A pin 13 passes through the slot 11 and the slot 12 and said pin extends horizontally from the upper end of a rod 14 which is supported for sliding movement in the bushing 9 and carries a bearing member 15 at its lower end for a stub shaft which carries a roller 16. A spring 17 on the lower part of the rod engages the lower end of the bushing 9 and a projection on the rod and tends to hold the rod 14 in lowered position. The roller 16 is adapted to engage a cam 18 fastened to a shaft 19 rotatably supported in the casing and this shaft is connected by the worm gearing 20 with the shaft of a magnetic motor M in the casing.

Figure 2:
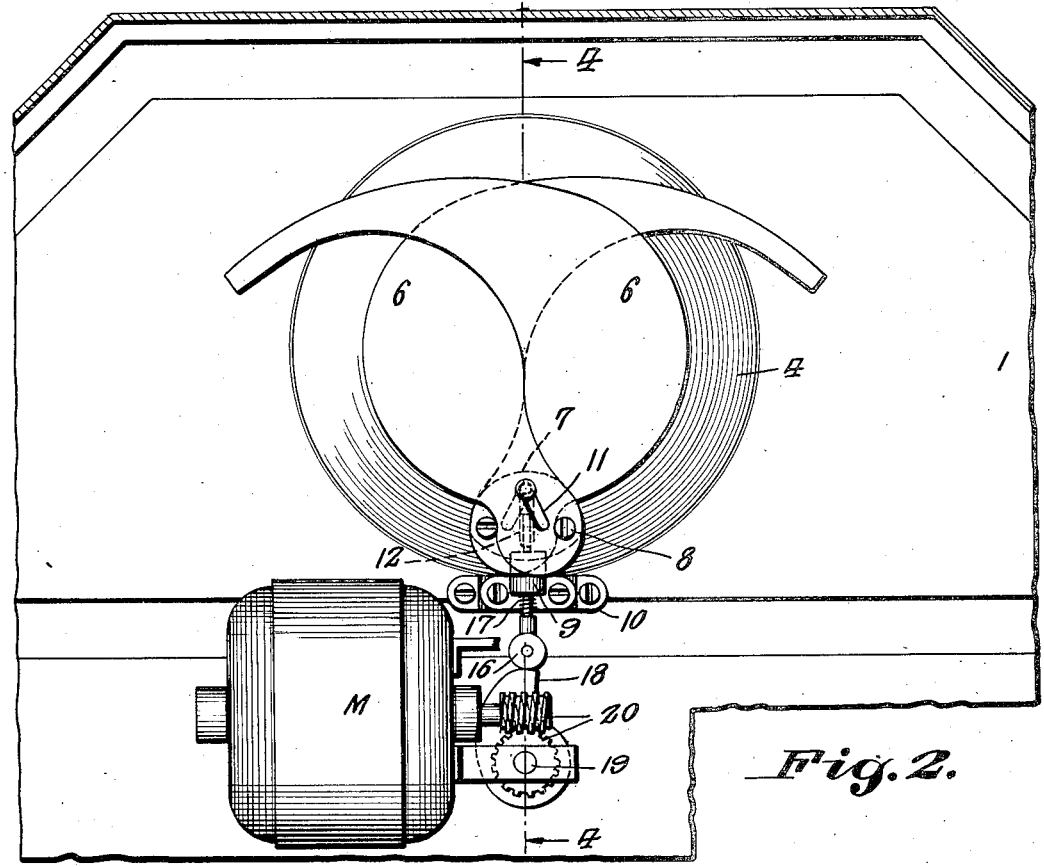
Figure 2 is a sectional view thereof, showing the internal parts in elevation and with the shutter means in closed position.
Figure 3:
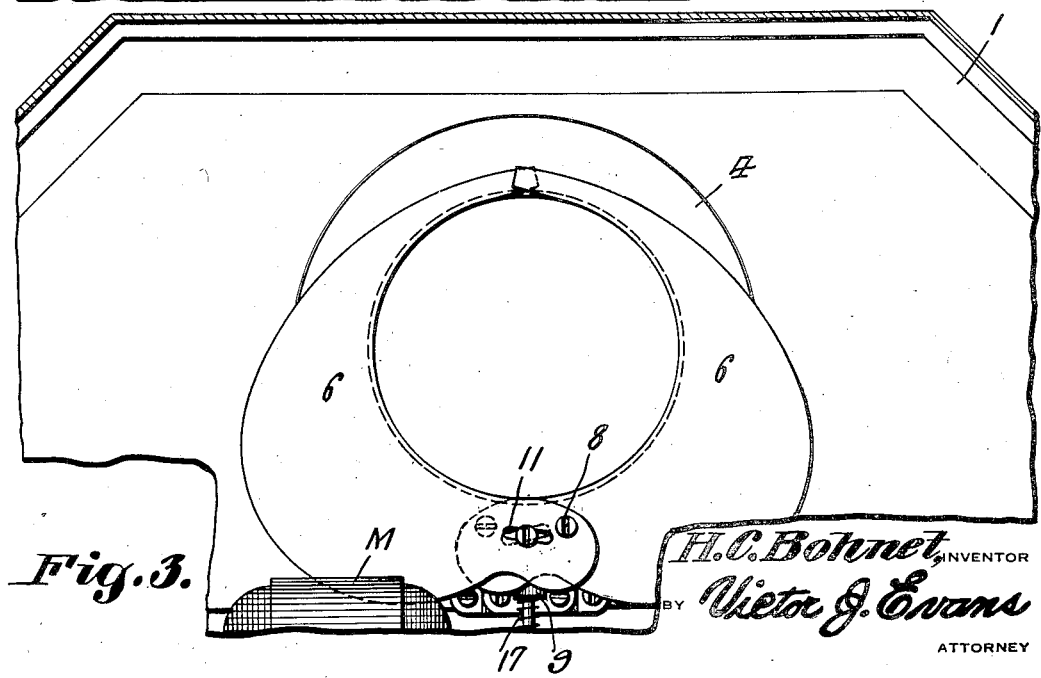
Figure 3 is a view showing the shutter means in open position.
Figure 6:
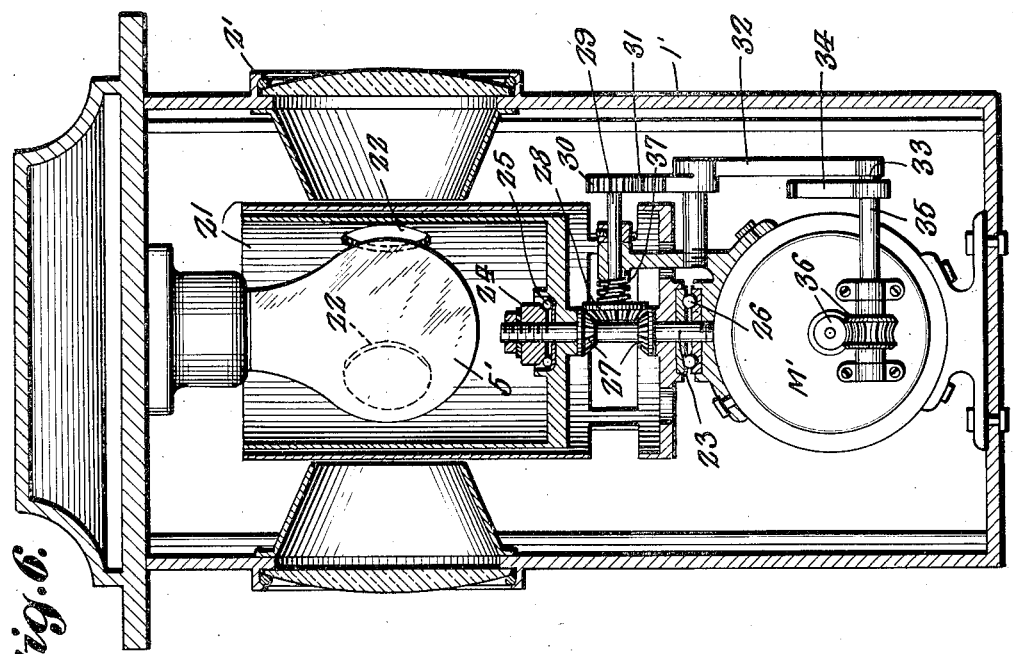
Figure 6 is a vertical sectional view through Figure 5.
Figure 5:
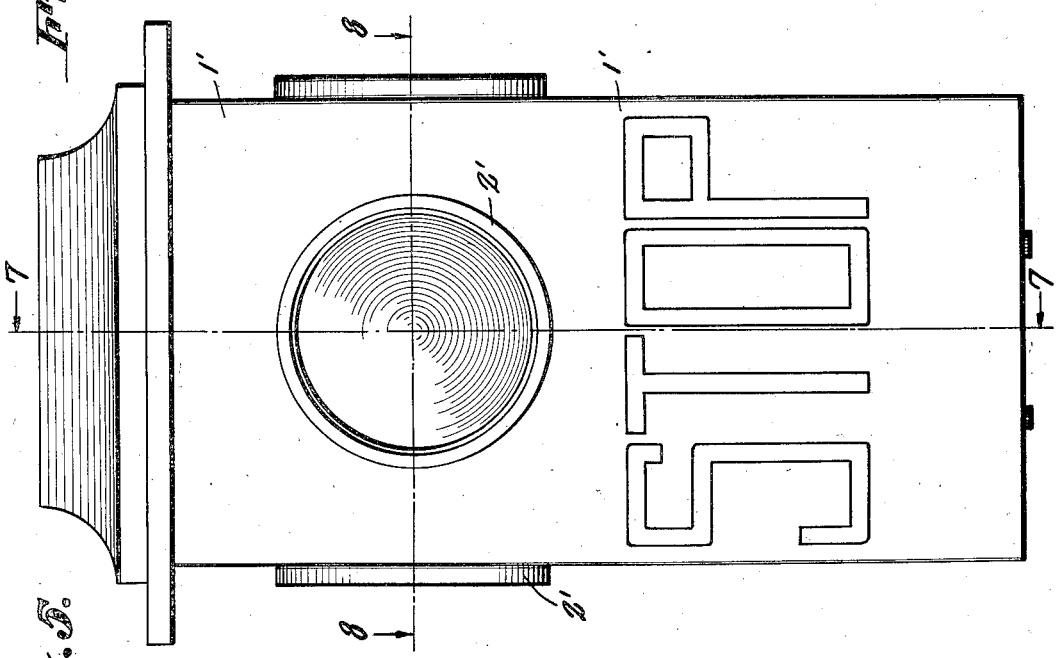
Figure 5 is an elevation showing a modification.

From the foregoing it will be seen that the spring 17 tends to hold the rod 14 with the pin 13 thereon in lowered position and in this position of the pin 13, the shutter parts 6 are held in open position, as shown in Figure 3, so that the rays of light can pass from the lamp through the lens. During the rotation of the shaft 19 by the motor, the cam will engage the roller 16 and force the rod 14 upwardly so that the pin 13, engaging the walls of the slots 11, will cause the shutter parts 6 to move to closed position, as shown in Figure 2, so that no light rays can pass through the lens. Thus an intermittent opening and closing movement is imparted to the shutters by the motor.

In the modification shown in Figures 5, 6, 7 and 8, the casing 1' is formed with four windows 2', one in each side thereof, and the passage of the rays of light from the lamp 5' through such windows is controlled by a shutter composed of two cylinders 21, each formed with four openings 22. A magnetic motor M' is arranged in the lower part of the casing and a vertical shaft 23 has its lower end attached to a support on the motor. This shaft passes through the bottoms of the two cylinders 21 and has nuts 24 on its upper end for holding the parts together. Anti-friction means 25 are placed between the bottom of the inner cylinder and the lowermost nut and anti-friction means 26 are placed between the support on the motor and the bottom of the outer cylinder. A pair of oppositely arranged beveled gears 27 is carried by the shaft 23, these gears being located between the bottoms of the cylinders and a beveled pinion 28, carried by a horizontal shaft 29, meshes with the gears 27. A pinion 30 on the outer end of the shaft 29, meshes with a segmental gear 31 on the upper end of a lever 32 which has a roller 33 at its lower end which is engaged by a cam 34 carried by a shaft 35 which is connected by the worm gears 36 with the shaft of the motor M'. A spring 37 on the shaft 29 has one end connected with a stationary part and its other end with a gear 28 and this spring tends to hold the parts with the roller 33 on the lever 32 against the cam 34. Thus during the rotation of the motor, the cam 34, engaging the roller 33, will swing the lever 32 outwardly and this movement of the lever will be communicated to the shaft 29 through the gears 30 and 31, thus causing the gears 27 and 28 to rotate the cylinders 21 in opposite directions so as to bring their openings 22 into alignment and thus permit the light rays from the lamp to pass through the lenses in the windows. When the cam passes beyond the roller, the spring 37 will return the parts to their normal position, where the openings 22 in the cylinders 21 will be out of alignment and thus no light rays can pass through the windows.

Thus it will be seen that in both forms of the invention, a flashing signal is given, which acts to call attention to the signal and by the use of a magnetic motor, the device will not interfere with radio and similar devices.

While the first form of the invention shows but one window, it will, of course, be understood that the casing can be provided with more than one, though in this case, each window must be controlled by a shutter arrangement similar to that shown.

Attention is called to the fact that the use of the cam for operating the shutter will cause the shutter to be opened instantaneously and the light rays will remain visible two-thirds of the cam area, while one-third remains dark. The two cylinders, traveling in opposite directions, will give a quick change of light from off to on, thus increasing the blinker effect. The devices shown are intended for blinker light only and not for traffic stop and go signals, although the same mechanism can be used for stop and go signals with the installation of extra lenses above the ones now shown, and the re-timing of the cams.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A flash signal device comprising a casing having a window therein, a light source located within the casing to project a beam through the window, a pair of oscillating angularly movable shutters mounted in the casing between the light source and the window, a post acting as a common pivot point of said shutters, a bevel gear connected with each shutter, a bevel gear meshing with the first two bevel gears, a shaft carrying the last said bevel gear, a motor, a cam driven by said motor, an arm having a terminal roller bearing on the periphery of said cam and a segment and gear connection with said shaft to move the shutters into shielding relation with the light source when the roller is on the rise of the cam, and a torsion spring surrounding said shaft to impart the reverse of the rotation imparted by the cam to move said shutters out of shielding relation when the roller is on the fall of the cam.

HERMAN C. BOHNET.